(12) United States Patent
Mizusaki et al.

(10) Patent No.: US 10,854,907 B2
(45) Date of Patent: Dec. 1, 2020

(54) FUEL CELL SYSTEM

(71) Applicant: HONDA MOTOR CO., LTD., Tokyo (JP)

(72) Inventors: Kimiharu Mizusaki, Wako (JP); Hideharu Naito, Wako (JP); Kosuke Takagi, Wako (JP); Masahiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 16/278,995

(22) Filed: Feb. 19, 2019

(65) Prior Publication Data
US 2019/0260059 A1  Aug. 22, 2019

(30) Foreign Application Priority Data

Feb. 21, 2018 (JP) ................. 2018-028470

(51) Int. Cl.
*H01M 8/2475* (2016.01)
*H01M 8/04089* (2016.01)
*H01M 8/12* (2016.01)
*H01M 8/1018* (2016.01)

(52) U.S. Cl.
CPC ..... *H01M 8/2475* (2013.01); *H01M 8/04089* (2013.01); *H01M 8/12* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

| 9,093,698 | B2 | 7/2015 | Tanaka | |
| 2007/0099061 | A1* | 5/2007 | Na | H01M 8/2415 |
| | | | | 429/410 |
| 2007/0141455 | A1* | 6/2007 | Marukawa | H01M 2/1083 |
| | | | | 429/120 |
| 2008/0156549 | A1* | 7/2008 | Leboe | H01M 8/04559 |
| | | | | 180/65.1 |
| 2016/0190632 | A1* | 6/2016 | Itoga | H01M 8/248 |
| | | | | 429/467 |
| 2018/0166731 | A1* | 6/2018 | Yu | H01M 8/04201 |

FOREIGN PATENT DOCUMENTS

| JP | 2004-186029 | 7/2004 |
| JP | 2005-071960 | 3/2005 |
| JP | 2006-302606 | 11/2006 |

(Continued)

OTHER PUBLICATIONS

Japanese Office Action for Japanese Patent Application No. 2018-028470 dated Aug. 6, 2019.

*Primary Examiner* — Alix E Eggerding
(74) *Attorney, Agent, or Firm* — Amin, Turocy & Watson, LLP

(57) ABSTRACT

A permanent magnet is expressed by a composition formula: $R_p Fe_q M_r Cu_s Co_{100-p-q-r-s}$. M is at least one element selected from the group consisting of Zr, Ti, and Hf. The magnet includes a crystal grain having a main phase including a $TbCu_7$ crystal phase, and a volume ratio of the $TbCu_7$ crystal phase to the main phase is 95% or more.

7 Claims, 6 Drawing Sheets

(56) References Cited

FOREIGN PATENT DOCUMENTS

| | | |
|---|---|---|
| JP | 2010-212014 | 9/2010 |
| JP | 2013-206855 | 10/2013 |
| JP | 2016-115446 | 6/2016 |
| JP | 2016-122502 | 7/2016 |
| JP | 2016-195017 | 11/2016 |
| WO | 2007/046490 | 4/2007 |
| WO | 2017/098787 | 6/2017 |

\* cited by examiner

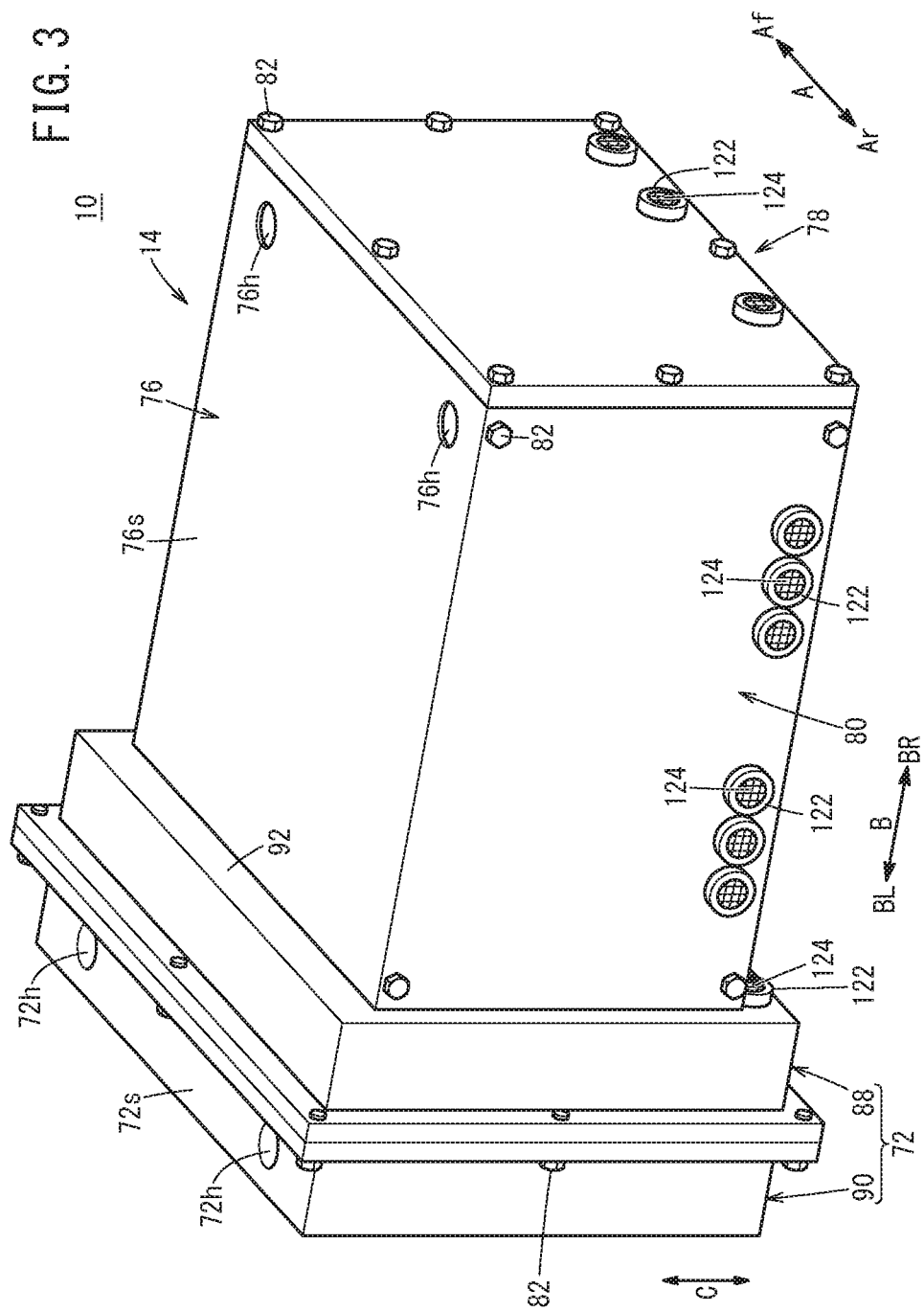

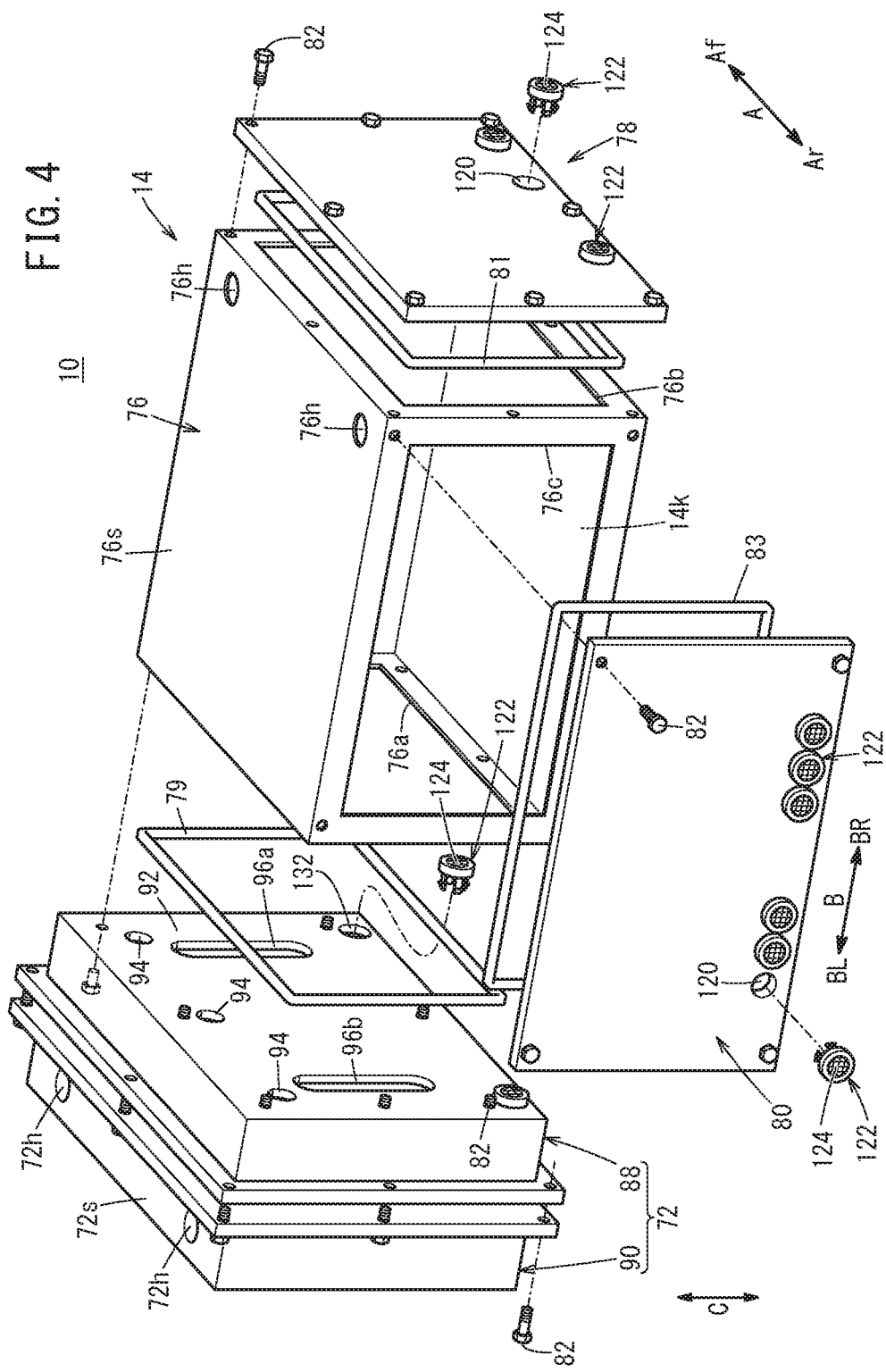

FUEL CELL SYSTEM

CROSS-REFERENCE TO RELATED APPLICATION

This application is based upon and claims the benefit of priority from Japanese Patent Application No. 2018-028470 filed on Feb. 21, 2018, the contents of which are incorporated herein by reference.

BACKGROUND OF THE INVENTION

Field of the Invention

The present invention relates to a fuel cell system including a ventilation mechanism of a stack case.

Description of the Related Art

For example, a solid polymer electrolyte fuel cell employs a membrane electrode assembly (MEA). The membrane electrode assembly includes an electrolyte membrane, an anode provided on one side of the electrolyte membrane, and a cathode provided on the other side of the electrolyte membrane. The electrolyte membrane is a polymer ion exchange membrane. The membrane electrode assembly is sandwiched between separators to form a power generation cell (unit cell). In the fuel cell, in general, a predetermined number of power generation cells are stacked together to form, e.g., an in-vehicle fuel cell stack mounted in a fuel cell vehicle.

The in-vehicle fuel cell stack adopts structure where a stack body formed by stacking a predetermined number of power generation cells is placed in a stack case. In this case, in the stack case, leakage of a hydrogen gas through gaps or the like of the stack body in the stack case may occur. Therefore, in the case where the stack body is placed in the stack case, the hydrogen gas leaked out of the stack body is accumulated in the stack case. In an attempt to address the problem, it is proposed to provide a ventilation mechanism which introduces the air from the outside into the stack case to thereby ventilate the internal space of the stack case so as to keep the concentration of the hydrogen gas to be not more than a certain concentration level (e.g., Japanese Laid-Open Patent Publication No. 2004-186029).

SUMMARY OF THE INVENTION

In this regard, since the ventilation mechanism includes the ventilating air channel connecting the inside and the outside of the stack case, foreign matters other than the air, such as water, dust, mud, pebbles may enter the stack case disadvantageously.

The present invention has been made taking such a problem into consideration, and an object of the present invention is to provide a fuel cell system which makes it possible to prevent entry of foreign matters other than the air into a stack case through a ventilation air inlet hole.

In order to achieve the above object, an aspect of the present invention provides a fuel cell system including a fuel cell stack, and a stack case containing the fuel cell stack. A gap is formed between outer periphery of the fuel cell stack and inner periphery of the stack case, a ventilation air inlet hole connected to the gap is formed at a lower position of the stack case in the vertical direction, a ventilation air outlet hole connected to the gap is formed at an upper position of the stack case in the vertical direction, and the ventilation air inlet hole is equipped with a filter unit including a liquid-impermeable and gas-permeable filter body.

Preferably, the filter body includes a porous membrane of resin or ceramics.

Preferably, the filter unit further includes a holder frame member configured to hold outer circumference of the filter body, and the holder frame member includes an engagement portion configured to be fitted into the ventilation air inlet hole.

Preferably, a plurality of the ventilation air inlet holes are arranged side by side in a horizontal direction, at lower positions of a side surface of the stack case in the vertical direction.

Preferably, the fuel cell system is mounted in a vehicle, and the ventilation air inlet hole is formed in a side surface serving as an end of the stack case on a rear side of the vehicle, or in a side surface serving as an end of the stack case in a vehicle width direction.

Preferably, the fuel cell system further includes an auxiliary device case adjacent to and joined to the stack case, wherein a ventilation air inlet hole is formed at a lower position of the auxiliary device case in the vertical direction, the ventilation air inlet hole connects the inside and the outside of the auxiliary device case, and the ventilation air inlet hole of the auxiliary device case is equipped with a filter unit including a liquid-impermeable and gas-permeable filter body.

In the fuel cell stack of the present invention, it is possible to prevent entry of foreign matters other than air into the stack case through the ventilation air inlet hole.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a perspective view showing a case unit as viewed from a rear side of a vehicle;

FIG. 4 is an exploded perspective view showing a case unit;

DESCRIPTION OF THE PREFERRED EMBODIMENTS

Figure 1:
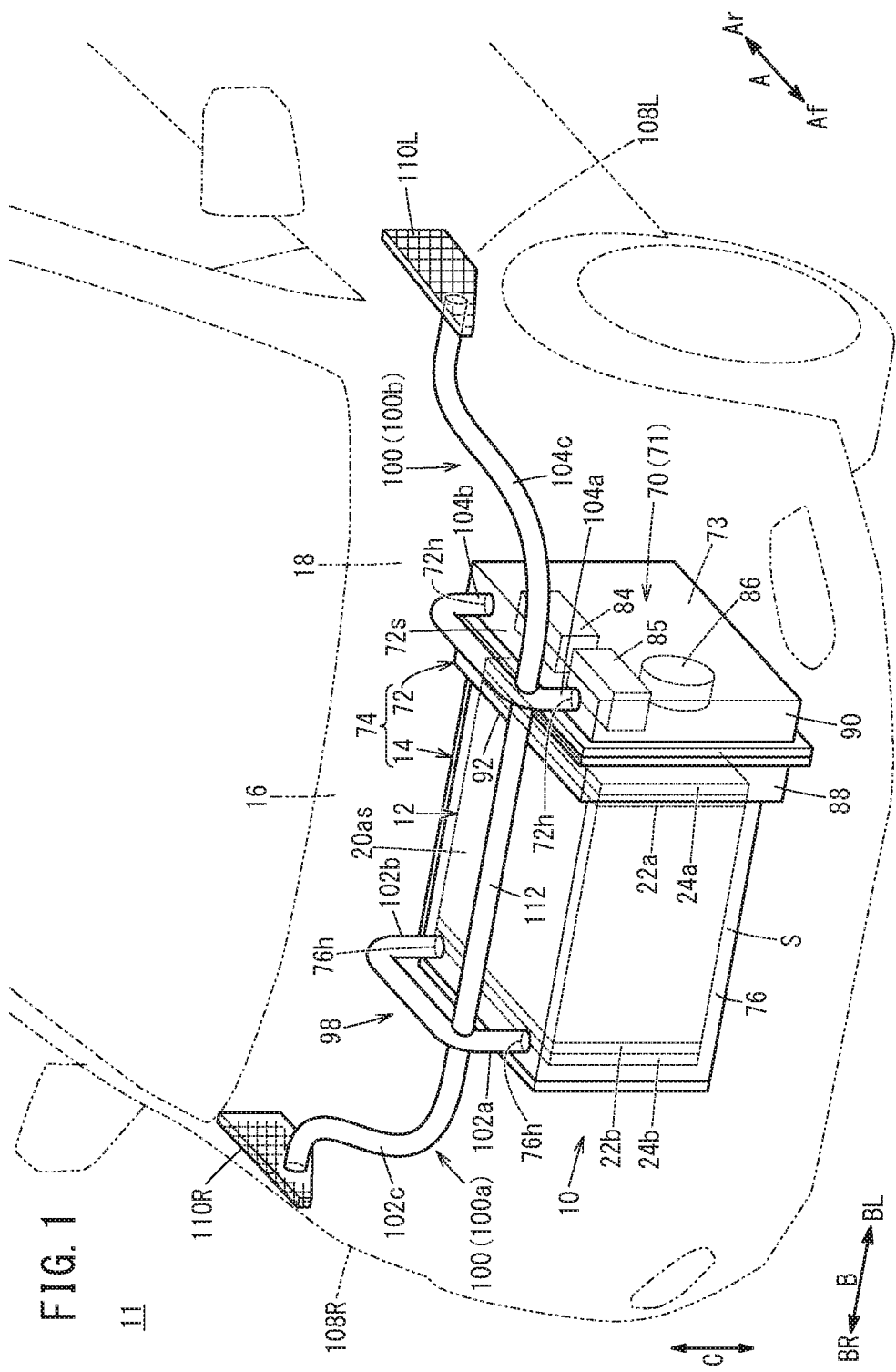
FIG. 1 is a perspective view showing a fuel cell vehicle equipped with a fuel cell system according to an embodiment of the present invention.

As shown in FIG. 1, for example, a fuel cell vehicle 11 equipped with a fuel cell system 10 according to an embodiment of the present invention is a fuel cell electric automobile. In the following description the "upper direction (upper part (upper position))" means the "upper direction (upper part (upper position))" in the vertical direction, whereas the "lower direction (lower part (lower position))" means the "lower direction (lower part (lower position))" in the vertical direction. In the fuel cell vehicle 11, a stack case 14 containing a fuel cell stack 12 is provided in a front room (motor room) 18 formed on the front side of a dash board 16 (in a direction indicated by an arrow Af).

The fuel cell stack 12 includes a cell stack body 20a is formed by stacking a plurality of power generation cells 20 (see FIG. 2) in a vehicle width direction (indicated by an arrow B). A first terminal plate 22a is provided at one end of the cell stack body 20a is in a stacking direction (indicated by an arrow BL). A first insulating plate 24a is provided outside the first terminal plate 22a. At the other end of the cell stack body 20a is in the stacking direction (indicated by an arrow BR), a second terminal plate 22b is provided. A second insulating plate 24b is provided outside the second terminal plate 22b. The fuel cell stack 12 is held between a right side panel 78 of the stack case 14 described later and a first case member 88 of an auxiliary device case 72 through a spacer (not shown), and a tightening load is applied to the fuel cell stack 12 in the stacking direction.

Figure 2:
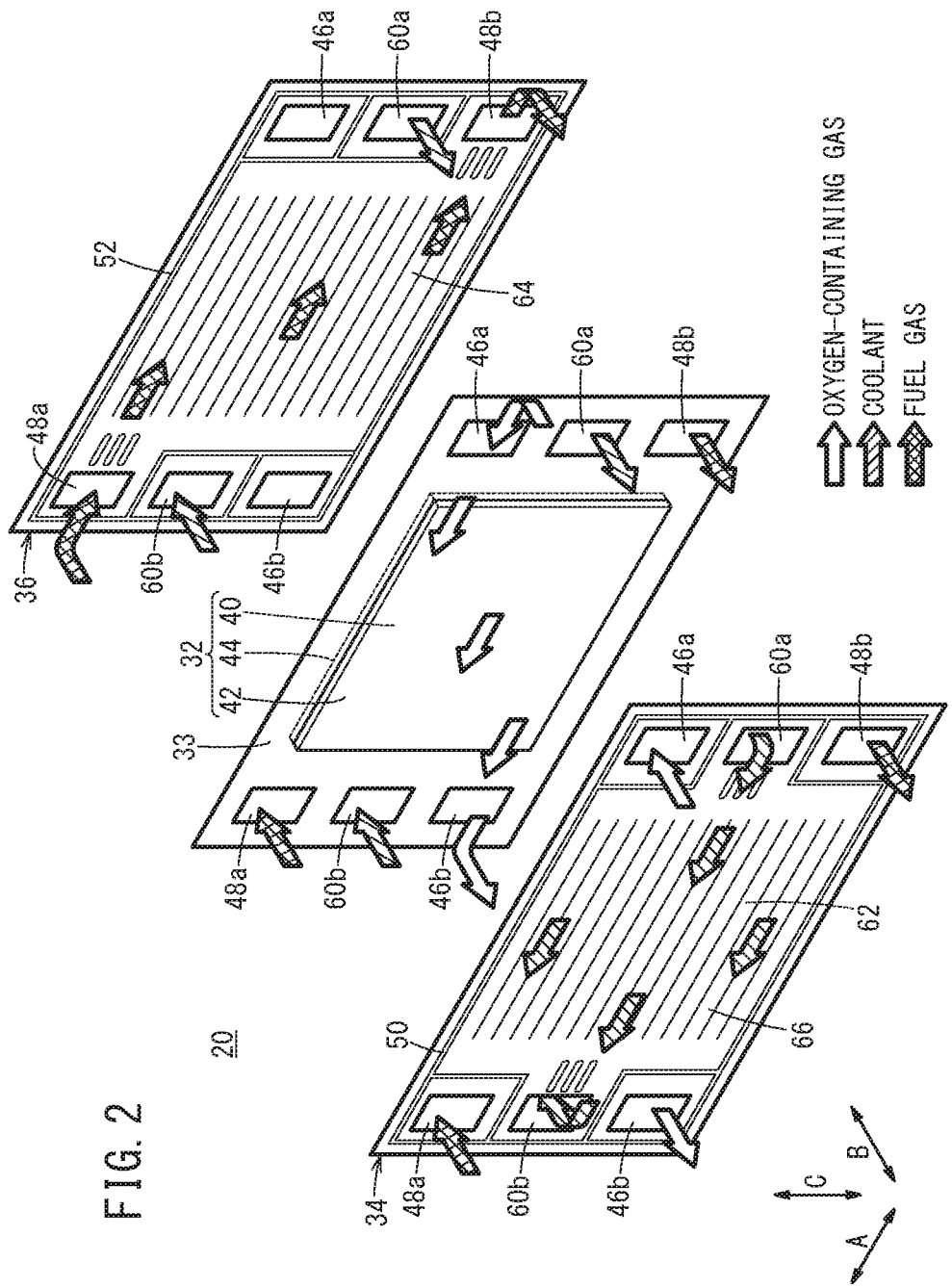
FIG. 2 is an exploded perspective view showing a power generation cell.

As shown in FIG. 2, the power generation cell 20 includes a membrane electrode assembly 32, and a first separator 34 and a second separator 36 sandwiching the membrane electrode assembly 32 from both sides. The membrane electrode assembly 32 includes an electrolyte membrane 40, and a cathode 42 and an anode 44 on both sides of the electrolyte membrane 40. A resin frame member 33 in the form of a film is provided over the entire outer peripheral portion of the membrane electrode assembly 32. The first separator 34 and the second separator 36 are metal separators or carbon separators.

At one end of the power generation cell 20 in a direction indicated by an arrow A, an oxygen-containing gas supply passage 46a, a coolant supply passage 60a, and a fuel gas discharge passage 48b are arranged in a direction indicated by an arrow C (vertical direction). The oxygen-containing gas supply passage 46a, the coolant supply passage 60a, and the fuel gas discharge passage 48b extend through the power generation cell 20 in the stacking direction indicated by the arrow B. An oxygen-containing gas is supplied through the oxygen-containing gas supply passage 46a. A coolant is supplied through the coolant supply passage 60a, and a fuel gas such as a hydrogen-containing gas is discharged through the fuel gas discharge passage 48b.

At the other end of the power generation cell 20 in the direction indicated by the arrow A, a fuel gas supply passage 48a for supplying the fuel gas, a coolant discharge passage 60b for discharging the coolant, and an oxygen-containing gas discharge passage 46b for discharging the oxygen-containing gas are arranged in the direction indicated by the arrow C. The fuel gas supply passage 48a, the coolant discharge passage 60b, and the oxygen-containing gas discharge passage 46b extend through the power generation cell 20 in the direction indicated by the arrow B.

The first separator 34 has an oxygen-containing gas flow field 62 on its surface facing the membrane electrode assembly 32. The oxygen-containing gas flow field 62 is connected to the oxygen-containing gas supply passage 46a and the oxygen-containing gas discharge passage 46b. The second separator 36 has a fuel gas flow field 64 on its surface facing the membrane electrode assembly 32. The fuel gas flow field 64 is connected to the fuel gas supply passage 48a and the fuel gas discharge passage 48b.

A coolant flow field 66 is formed between the first separator 34 and the second separator 36 of the power generation cells 20 that are adjacent to each other. The coolant flow field 66 is connected to the coolant supply passage 60a and the coolant discharge passage 60b. Seal members 50, 52 are formed integrally with or separately from the first separator 34 and the second separator 36. The seal members 50, 52 contact the resin frame members 33, respectively. Instead of the seal members 50, 52, bead seals may be formed on the first separator 34 and the second separator 36 by press forming, in a manner that the bead seals protrude toward the resin frame member 33.

As shown in FIGS. 1 and 3, the fuel cell system 10 includes the stack case 14 containing the fuel cell stack 12 and an auxiliary device case 72 containing fuel cell auxiliary devices 70. The stack case 14 and the auxiliary device case 72 form a case unit 74. The case unit 74 made up of the stack case 14 and the auxiliary device case 72 has a quadrangular shape (a rectangular shape having long sides extending in the vehicle width direction) in a plan view. In the stack case 14, a gap S is formed between the outer periphery of the fuel cell stack 12 and the inner periphery of the stack case 14.

As shown in FIG. 4, the stack case 14 has a case body 76 having a quadrangular shape in a plan view. The case body 76 has a quadrangular left opening 76a formed on the left side (in a direction indicated by an arrow BL), a quadrangular right opening 76b formed on the right side (in a direction indicated by an arrow BR, and a quadrangular rear opening 76c formed on the rear side (in a direction indicated by an arrow Ar). The case body 76 has a box shape.

Holes 76h (ventilation air outlet hole) are formed at two corners of upper part of the case body 76 (in the illustrated embodiment, formed on an upper surface 76s of the case body 76 in the vertical direction) that are located remote from a side of the case body 76 to which the auxiliary device case 72 is joined. The stack case 14 is in fluid communication with the outside through the holes 76h. The hole 76h may be provided at only one of the two corners of the case body 76. The holes 76h may be formed on the upper part of a side surface other than the upper surface 76s of the stack case 14 in the vertical direction.

Further, the stack case 14 includes a right side panel 78 for closing the right opening 76b of the case body 76, and a rear side panel 80 for closing the rear opening 76c of the case body 76. The right side panel 78 is a quadrangular panel, and is joined to a right end of the case body 76 using bolts 82. The right side panel 78 also functions as one of the end plates which applies the tightening load to the fuel cell stack 12 (FIG. 1) in the stacking direction. A seal member 81 made of elastic material is provided between the case body 76 and the right side panel 78. The seal member 81 is provided over the entire periphery of the joint surface between the case body 76 and the right side panel 78.

The rear side panel 80 is a quadrangular panel, and is joined to the rear end of the case body 76 using bolts 82. A seal member 83 made of elastic material is provided between the case body 76 and the rear side panel 80. The seal member 83 is provided over the entire periphery of the joint surface between the case body 76 and the rear side panel 80. The rear side panel 80 needs not be a component formed separately from the case body 76, and may be formed integrally with the case body 76.

As shown in FIG. 1, the auxiliary device case 72 is a protection case for protecting the fuel cell auxiliary devices 70. The auxiliary device case 72 is provided adjacent to the stack case 14 in the horizontal direction, and joined to the stack case 14. The auxiliary device case 72 houses therein hydrogen system auxiliary devices (hydrogen gas supply devices) 71 as the fuel cell auxiliary devices 70. The hydrogen system auxiliary devices 71 include an injector 84, an ejector 85, a hydrogen pump 86, valves (not shown), etc. The auxiliary device case 72 includes a recessed first case member 88 provided adjacent to the stack case 14, and a recessed second case member 90 joined to the first case member 88. A storage space 73 storing the hydrogen system auxiliary devices 71 is formed by the first case member 88 and the second case member 90.

As shown in FIG. 4, the first case member 88 has a wall 92 (bottom wall of the first case member 88 having the recessed shape) joined to the case body 76. The first case member 88 is joined to a left end of the case body 76 using bolts 82. A seal member 79 made of elastic material is provided between the case body 76 and the first case member 88. The seal member 79 is provided over the entire periphery of the joint surface between the case body 76 and the first case member 88. The first case member 88 (part of the auxiliary device case 72) also functions as the other of the end plates which applies the tightening load to the fuel cell stack 12 (FIG. 1) in the stacking direction.

The internal space of the stack case 14 and the internal space of the auxiliary device case 72 are divided by the wall 92 of the first case member 88. A plurality of ventilation passages 94 are provided at upper positions of the wall 92. The ventilation passages 94 connect the internal space of the stack case 14 and the internal space of the auxiliary device case 72. The ventilation passages 94 are holes penetrating through the wall 92 in the thickness direction indicated by the arrow B. The ventilation passages 94 face the left opening 76a of the case body 76. The seal member 79 is provided outside the ventilation passages 94.

The ventilation passages 94 are arranged at intervals in the horizontal direction indicated by the arrow A which is perpendicular to the direction indicated by the arrow B in which the stack case 14 and the auxiliary device case 72 are joined together. The ventilation passages 94 are provided at least on both sides at upper positions of the auxiliary device case 72 (on both sides of the auxiliary device case 72 in the horizontal direction perpendicular to the direction in which the stack case 14 and the auxiliary device case 72 are joined together).

Piping openings 96a, 96b are formed in the wall 92 of the first case member 88. Connection pipes (not shown) are inserted into the piping openings 96a, 96b, and connected to the oxygen-containing gas supply passage 46a, the oxygen-containing gas discharge passage 46b, the fuel gas supply passage 48a, the fuel gas discharge passage 48b, the coolant supply passage 60a, and the coolant discharge passage 60b, which are formed in the fuel cell stack 12 (FIG. 2).

The second case member 90 is a cover member for closing the first case member 88, and is joined to the first case member 88 using bolts 82. Holes 72h (ventilation air outlet hole) are formed at two corners of upper part of the auxiliary device case 72 (in the illustrated embodiment, formed on an upper surface 72s of the auxiliary device case 72 in the vertical direction) that are located remote from a side of the auxiliary device case to which the stack case 14 is joined. Specifically, the holes 72h are formed at two corners of the upper part of the second case member 90. The hole 72h may be provided at only one of the two corners of the upper part of the second case member 90. The holes 72h may be provided at the upper part of a side surface other than the upper surface 72s of the second case member 90 in the vertical direction.

As shown in FIG. 1, the fuel cell system 10 includes an exhaust apparatus 98 for discharging a fuel gas from the case unit 74 (the stack case 14 and the auxiliary device case 72). The exhaust apparatus 98 includes ventilation ducts 100a, 100b connected to the case unit 74. The ventilation ducts 100a, 100b are connected to four corners of the case unit 74 in a plan view. Specifically, the exhaust apparatus 98 has a first ventilation duct 100a connected to the stack case 14, and a second ventilation duct 100b connected to the auxiliary device case 72.

The first ventilation duct 100a is connected to the holes 76h provided on the stack case 14. Therefore, the first ventilation duct 100a is connected to two corners of the upper part of the stack case 14 that are located remote from the side of the stack case connected to the auxiliary device case 72. The first ventilation duct 100a includes two connection pipes 102a, 102b connected to the two holes 76h of the stack case 14, and a merging pipe 102c. The two connection pipes 102a, 102b are merged together into the merging pipe 102c. The merging pipe 102c is connected to a right exhaust port 110R provided in a right fender 108R.

The second ventilation duct 100b is connected to the holes 72h formed in the auxiliary device case 72. Therefore, the second ventilation duct 100b is connected to the two corners of the upper part of the auxiliary device case 72 that are located remote from a side of the auxiliary device case to which the stack case 14 is connected. The second ventilation duct 100b includes two connection pipes 104a, 104b connected to the two holes 72h of the auxiliary device case 72, and a merging pipe 104c. The two connection pipes 104a, 104b are merged together into the merging pipe 104c. The merging pipe 104c is connected to a left exhaust port 110L provided in a left fender 108L.

The first ventilation duct 100a and the second ventilation duct 100b are connected together through a coupling pipe 112. The coupling pipe 112 is connected to the connection pipe 102a on the front side of the first ventilation duct 100a, and connected to the connection pipe 104a of the front side of the second ventilation duct 100b. Therefore, the first ventilation duct 100a and the second ventilation duct 100b are connected together on one side (front side) in a direction (indicated by the arrow A) perpendicular to the direction in which the stack case 14 and the auxiliary device case 72 are connected together, in a plan view. The coupling pipe 112 may be connected to the connection pipe 102b on the rear side of the first ventilation duct 100a and the connection pipe 104b on the rear side of the second ventilation duct 100b.

As shown in FIG. 4, in order to ventilate the internal space of the stack case 14 by introducing the air into the stack case 14 from the outside, ventilation air inlet holes 120 are formed at lower positions of the stack case 14. The ventilation air inlet holes 120 are connected to a gap S (FIG. 1) formed between the outer periphery of the fuel cell stack 12 and the inner periphery of the stack case 14. The lower position of the stack case 14 herein means a portion below the center of the stack case 14 in the vertical direction. The ventilation air inlet holes 120 are formed in a side surface as an end of the stack case 14 in the vehicle width direction (indicated by an arrow B) and in a side surface as an end of the stack case 14 on the rear side of the stack case 14 in the direction indicated by the arrow Ar.

In the embodiment of the present invention, a plurality of the ventilation air inlet holes 120 are formed at the lower positions of the right side panel 78, and a plurality of the other ventilation air inlet holes 120 are formed at the lower positions of the rear side panel 80.

The plurality of the ventilation air inlet holes 120 of the right side panel 78 are arranged in parallel in the horizontal direction indicated by the arrow A which is the front/rear direction of the vehicle. The positions in the vertical direction (heights) of the ventilation air inlet holes 120 formed in the right side panel 78 may be the same or different.

The plurality of the ventilation air inlet holes 120 of the rear side panel 80 are formed in parallel in the horizontal direction which is the vehicle width direction. The positions in the vertical direction (heights) of the ventilation air inlet holes 120 formed in the rear side panel 80 may be the same or different.

Each of the plurality of ventilation air inlet holes 120 is equipped with a filter unit 122. Therefore, the fuel cell system 10 includes the plurality of filter units 122 at lower positions of the stack case 14.

Figure 5A:
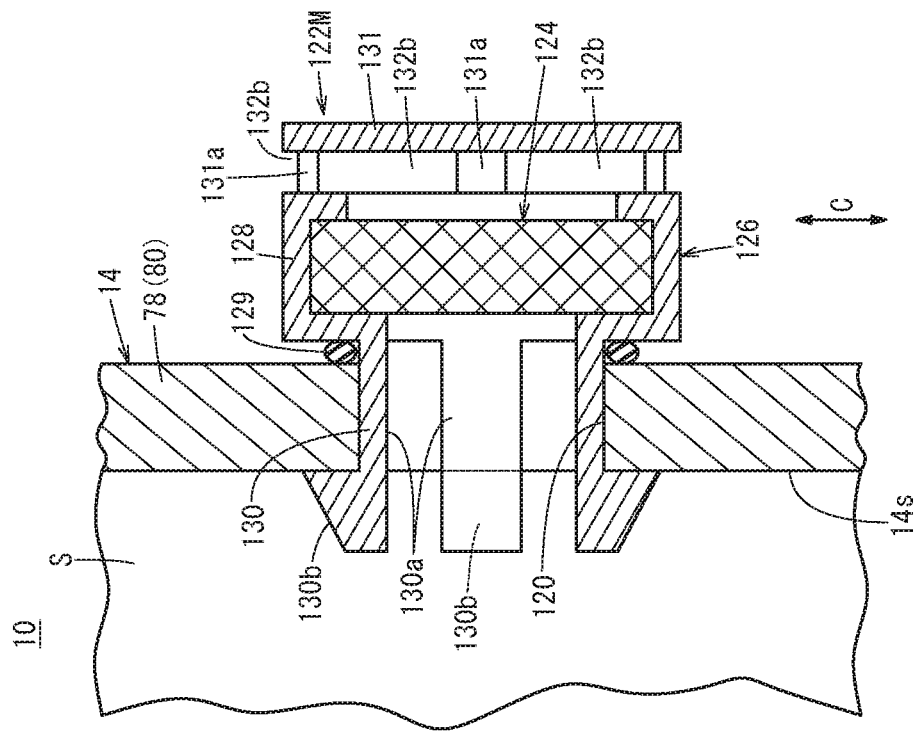
FIG. 5A is a view showing a structure of a filter unit.

As shown in FIG. 5A, each of the filter units 122 includes a filter body 124, and a holder frame member 126 holding an outer circumference of the filter body 124. The filter body 124 is liquid-impermeable and gas-permeable. Therefore, the filter body 124 blocks permeation of water, but allows permeation of air. Preferably, the filter body 124 is made of a porous membrane of resin (e.g., tetrafluoroethylene) or ceramics. The filter body 124 has a circular disk shape. The filter body 124 may have another shape (oval shape, quadrangular shape).

The holder frame member 126 includes a hollow tubular holder portion 128 surrounding the filter body 124 over the entire circumference, and an engagement portion 130 protruding from the holder portion 128. The holder portion 128 holds the filter body 124 outside the stack case 14. A ring shaped seal member 129 made of elastic material is provided between the stack case 14 and the holder portion 128, whereby a gap between the stack case 14 and the holder portion 128 is hermetically sealed. The seal member 129 is provided over the entire periphery around the engagement portion 130 and between surfaces of the stack case 14 and the holder portion 128 that face each other. The engagement portion 130 is fitted into the ventilation air inlet hole 120. The engagement portion 130 includes a plurality of elastic pieces 130a arranged at intervals in the circumferential direction. Each of the elastic pieces 130a has, at a front end thereof, a claw 130b configured to be engaged with an inner surface 14s of the stack case 14.

Figure 5B:
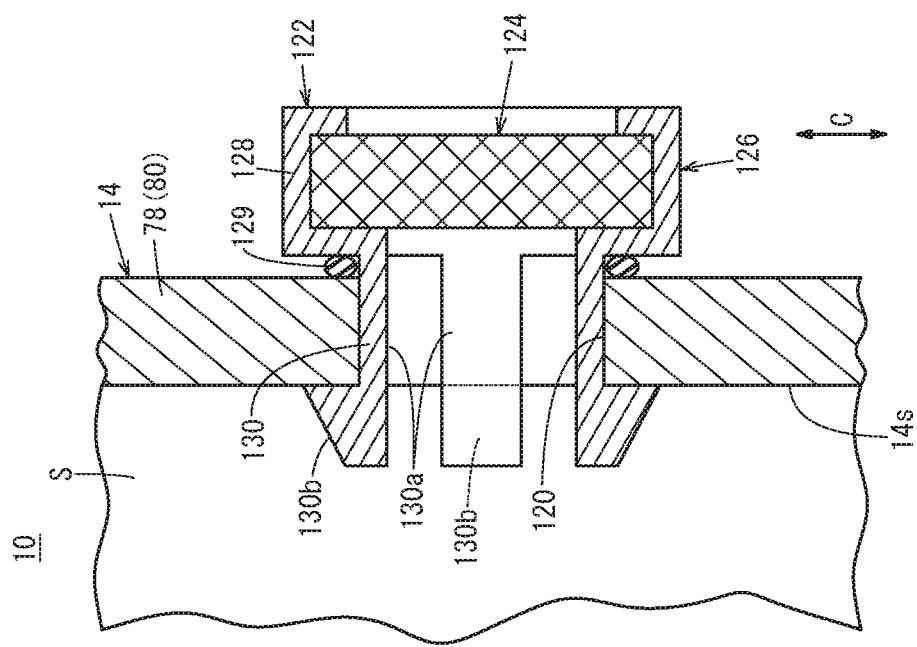
FIG. 5B is a view showing a structure of a filter unit according to another structure.

Instead of the filter unit 122 shown in FIG. 5A, a filter unit 122M shown in FIG. 5B may be used. The filter unit 122M further includes an opposed wall 131 facing the holder portion 128 and the filter body 124 through a gap outside the stack case 14. The opposed wall 131 is coupled to the holder portion 128 through a plurality of coupling portions 131a provided at intervals in the circumferential direction. An air inlet channel 132b is formed between the opposed wall 131 and the holder portion 128. The air inlet channel 132b is opened on the outer circumferential surface of the holder portion 128. A plurality of air inlet channels 132b are formed at intervals in the circumferential direction. Since the opposed wall 131 is provided, direct entry of water or foreign matters into the filter body 124 is suppressed. Hereinafter, the features which will be described with respect to the filter unit 122 are also applicable to the filter unit 122M as well.

These ventilation air inlet holes 120 and the filter units 122 may be provided on a lower surface 14k of the stack case 14 in the vertical direction (see FIGS. 4 and 6), instead of the side surfaces (side panels) of the stack case 14, or in addition to the side surfaces of the stack case 14.

Figure 6:
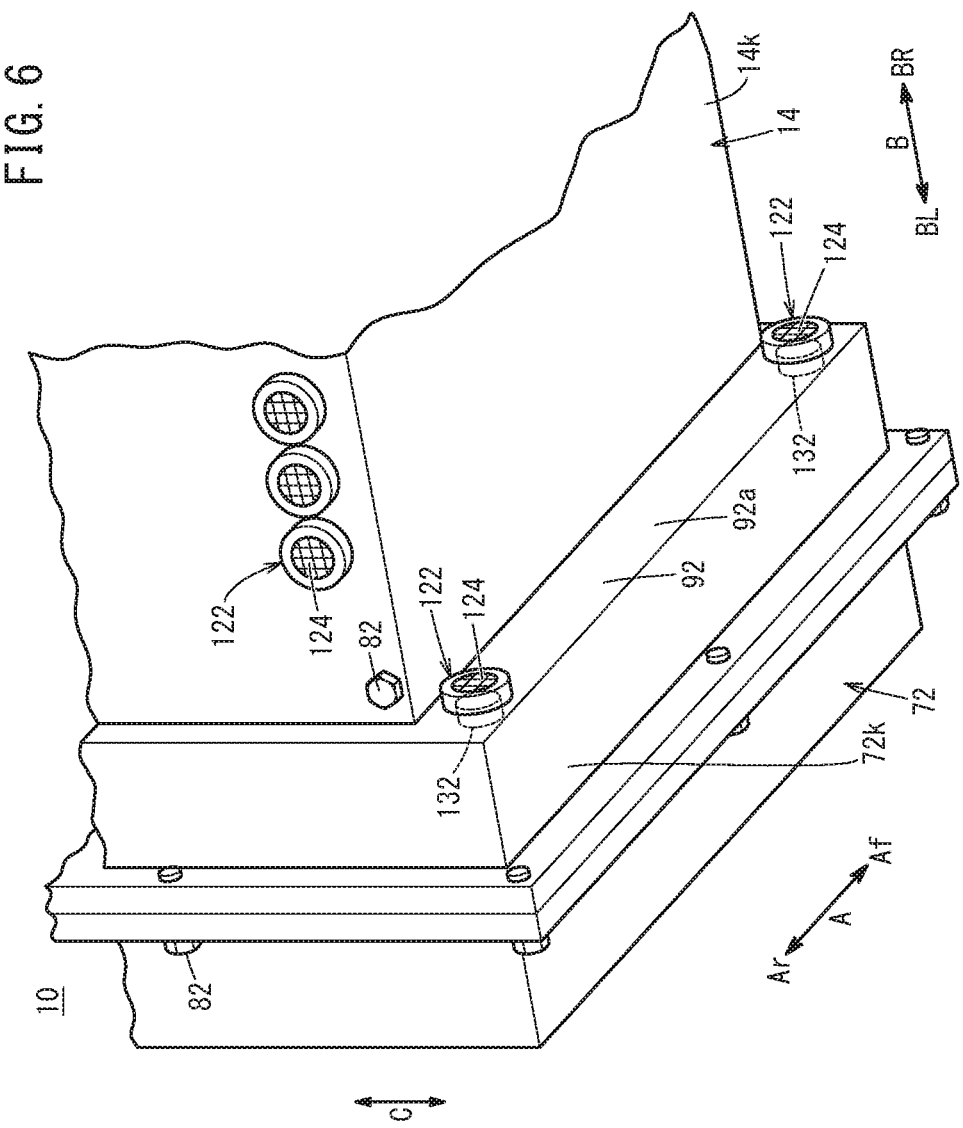
FIG. 6 is a perspective view showing a case unit as viewed from a lower side.

As shown in FIG. 6, a plurality of ventilation air inlet holes 132 are formed at lower positions of the auxiliary device case 72 so as to be arranged at intervals in the horizontal direction. The inside and the outside of the auxiliary device case 72 are connected through the ventilation air inlet holes 132. Each of the ventilation air inlet holes 132 is equipped with the filter unit 122. Only one ventilation air inlet hole 132 may be provided in the auxiliary device case 72. The lower part of the auxiliary device case 72 protrudes downward beyond the lower surface 14k of the stack case 14. Specifically, the ventilation air inlet holes 132 and the filter units 122 are provided on a lower part 92a of the joint surface (wall 92) between the auxiliary device case 72 and the stack case 14, the lower part 92a being located below the lower surface 14k of the stack case 14.

Preferably, the plurality of ventilation air inlet holes 132 and the filter units 122 are provided at least at two corners of the lower portion of the auxiliary device case 72. The filter unit 122 may be at least partially covered with the stack case 14. The ventilation air inlet holes 132 and the filter units 122 may be provided on a lower surface 72k (lower surface of the first case member 88 or the lower surface of the second case member 90) of the auxiliary device case 72.

Operation of the fuel cell vehicle 11 having the structure as described above will be described below.

At the time of operating the fuel cell vehicle 11 shown in FIG. 1, a fuel gas, an oxygen-containing gas, and a coolant are supplied to the fuel cell stack 12. As shown in FIG. 2, the fuel gas flows from the fuel gas supply passage 48a into the fuel gas flow field 64 of the second separator 36. This fuel gas (hydrogen gas) is supplied along the anode 44 of the membrane electrode assembly 32. The oxygen-containing gas flows from the oxygen-containing gas supply passage 46a into the oxygen-containing gas flow field 62 of the first separator 34. The oxygen-containing gas is supplied along the cathode 42 of the membrane electrode assembly 32.

Thus, in the membrane electrode assembly 32, the hydrogen gas supplied to the anode 44 and the air supplied to the cathode 42 are consumed in electrochemical reactions at the electrode catalyst layers to generate electricity. Then, the fuel gas is discharged from the fuel gas discharge passage 48b. The oxygen-containing gas is discharged from the oxygen-containing gas discharge passage 46b.

In the meanwhile, the coolant is supplied to the coolant supply passage 60a, and then flows into the coolant flow field 66 between the first separator 34 and the second separator 36. After the coolant cools the membrane electrode assembly 32, the coolant is discharged through the coolant discharge passage 60b.

In FIG. 1, in the case where leakage of the fuel gas from the fuel cell stack 12 into the stack case 14 occurs, or in the case where leakage of the fuel gas from the hydrogen system auxiliary device 71 into the auxiliary device case 72 occurs, the fuel gas flows from the right and left exhaust ports 110R, 110L to the outside of the vehicle through the exhaust apparatus 98 (the first ventilation duct 100a and the second ventilation duct 100b).

The fuel cell system 10 according to the embodiment of the present invention offers the following advantages.

In the fuel cell system 10 according to the present invention, as shown in FIG. 4, etc., the filter unit 122 including the filter body 124 that is liquid-impermeable and gas-permeable is provided at the ventilation air inlet holes 120 formed at the lower positions of the stack case 14 in the vertical direction. In the structure, it is possible to prevent entry of water and/or foreign matters into the stack case 14 through the ventilation air inlet holes 120.

A plurality of the ventilation air inlet holes 120 are arranged side by side in the horizontal direction, at lower positions of the side surfaces of the stack case 14. In the structure, it is possible to efficiently introduce a required quantity of ventilation air into the stack case 14. Thus, it is possible to improve the ventilation performance.

As shown in FIG. 5A, the filter unit 122 includes a holder frame member 126 holding the outer circumference of the filter body 124, and the holder frame member 126 includes an engagement portion 130 configured to be fitted into the ventilation air inlet hole 120. In the structure, it is possible to easily attach the filter unit 122 to the ventilation air inlet hole 120 and stably position the filter unit 122.

In the case where the filter body 124 is a porous membrane of resin or ceramics, it is possible to prevent entry of water and/or foreign matters into the stack case 14 more effectively.

As shown in FIG. 6, the fuel cell system 10 includes the auxiliary device case 72, which has the ventilation air inlet hole 132 formed at the lower part thereof. The ventilation air inlet hole 132 is equipped with the filter unit 122 including a liquid-impermeable and gas-permeable filter body 124. In the structure, it is possible to improve the ventilation performance in the auxiliary device case 72, and prevent entry of water and/or foreign matters into the auxiliary device case 72.

In the embodiment of the present invention described above, the fuel cell system 10 is mounted in the fuel cell vehicle 11 in a manner that the stacking direction of the fuel cell stack 12 is oriented in the vehicle width direction indicated by the arrow B. Alternatively, the fuel cell system 10 may be mounted in the fuel cell vehicle 11 in a manner that the stacking direction of the fuel cell stack 12 is oriented in the front/rear direction of the vehicle indicated by the arrow A. In the embodiment of the present invention described above, the fuel cell system 10 is mounted in the fuel cell vehicle 11 in a manner that the stack case 14 is provided on the right side, and the auxiliary device case 72 is provided on the left side. Alternatively, the fuel cell system 10 may be mounted in the fuel cell vehicle 11 in a manner that the stack case 14 is provided on the left side, and the auxiliary device case 72 is provided on the right side.

The present invention is not limited to the embodiment described above, and various modifications may be made without departing from the gist of the present invention.

What is claimed is:

1. A fuel cell system comprising:
   a fuel cell stack; and
   a stack case containing the fuel cell stack,
   wherein the fuel cell system is mounted in a vehicle,
   a gap is formed between outer periphery of the fuel cell stack and inner periphery of the stack case;
   a plurality of ventilation air inlet holes that are arranged side by side in a horizontal direction, the plurality of ventilation air inlet holes extending through the outer periphery of the stack case and the inner periphery of the stack case to be connected to the gap, the plurality of ventilation air inlet holes being formed at a lower position of the stack case in a vertical direction in a side surface serving as an end of the stack case on a rear side of the vehicle and a side surface serving as an end of the stack case in a vehicle width direction other than a side surface serving as an end of the stack case on a front side of the vehicle, the side surface serving as the end of the stack case on the rear side being perpendicular to the side surface serving as the end of the stack case in the vehicle width direction;
   a ventilation air outlet hole connected to the gap is formed at an upper position of the stack case in the vertical direction; and
   the ventilation air inlet hole is equipped with a filter unit including a liquid-impermeable and gas-permeable filter body.

2. The fuel cell system according to claim 1, wherein the filter body comprises a porous membrane of resin or ceramics.

3. The fuel cell system according to claim 1, wherein the filter unit further includes a holder frame member configured to hold outer circumference of the filter body, and the holder frame member includes an engagement portion configured to be fitted into the ventilation air inlet hole.

4. The fuel cell system according to claim 3, wherein the holder frame member includes a hollow tubular holder portion configured to hold the filter body outside the stack case.

5. The fuel cell system according to claim 4, wherein a ring shaped seal member is provided between the holder portion and the stack case.

6. The fuel cell system according to claim 3, wherein the filter unit further includes a wall disposed outside the stack case and facing the holder frame member and the filter body through a gap,
   the wall is connected to the holder frame member through a plurality of coupling portions provided at intervals in a circumferential direction, and
   an air inlet channel is formed between the wall and the holder frame member.

7. The fuel cell system according to claim 1, further comprising an auxiliary device case adjacent to and joined to the stack case,
   wherein a ventilation air inlet hole is formed at a lower position of the auxiliary device case in the vertical direction, and the ventilation air inlet hole connects an inside and an outside of the auxiliary device case;
   a ventilation air outlet hole is formed at an upper position of the auxiliary device case in the vertical direction, and the ventilation air outlet hole connects the inside and the outside of the auxiliary device case; and
   the ventilation air inlet hole of the auxiliary device case is equipped with a filter unit including a liquid-impermeable and gas-permeable filter body.

* * * * *

UNITED STATES PATENT AND TRADEMARK OFFICE
CERTIFICATE OF CORRECTION

PATENT NO. : 10,854,907 B2
APPLICATION NO. : 16/278995
DATED : December 1, 2020
INVENTOR(S) : Mizusaki et al.

Page 1 of 1

It is certified that error appears in the above-identified patent and that said Letters Patent is hereby corrected as shown below:

On the Title Page

Item (57) should read:
A fuel cell system includes a stack case containing a fuel cell stack. Ventilation air inlet holes are formed at lower positions of the stack case in the vertical direction, and ventilation air outlet holes (holes) are formed at upper positions of the stack case in the vertical direction. Each of the ventilation air inlet holes is equipped with a filter unit having a liquid-impermeable and gas-permeable filter body.

Signed and Sealed this
Second Day of March, 2021

Drew Hirshfeld
*Performing the Functions and Duties of the
Under Secretary of Commerce for Intellectual Property and
Director of the United States Patent and Trademark Office*